Aug. 28, 1956      W. D. GLADD      2,760,289
LICENSE PLATE MOUNTING FOR VEHICLE FENDERS
Filed April 13, 1954
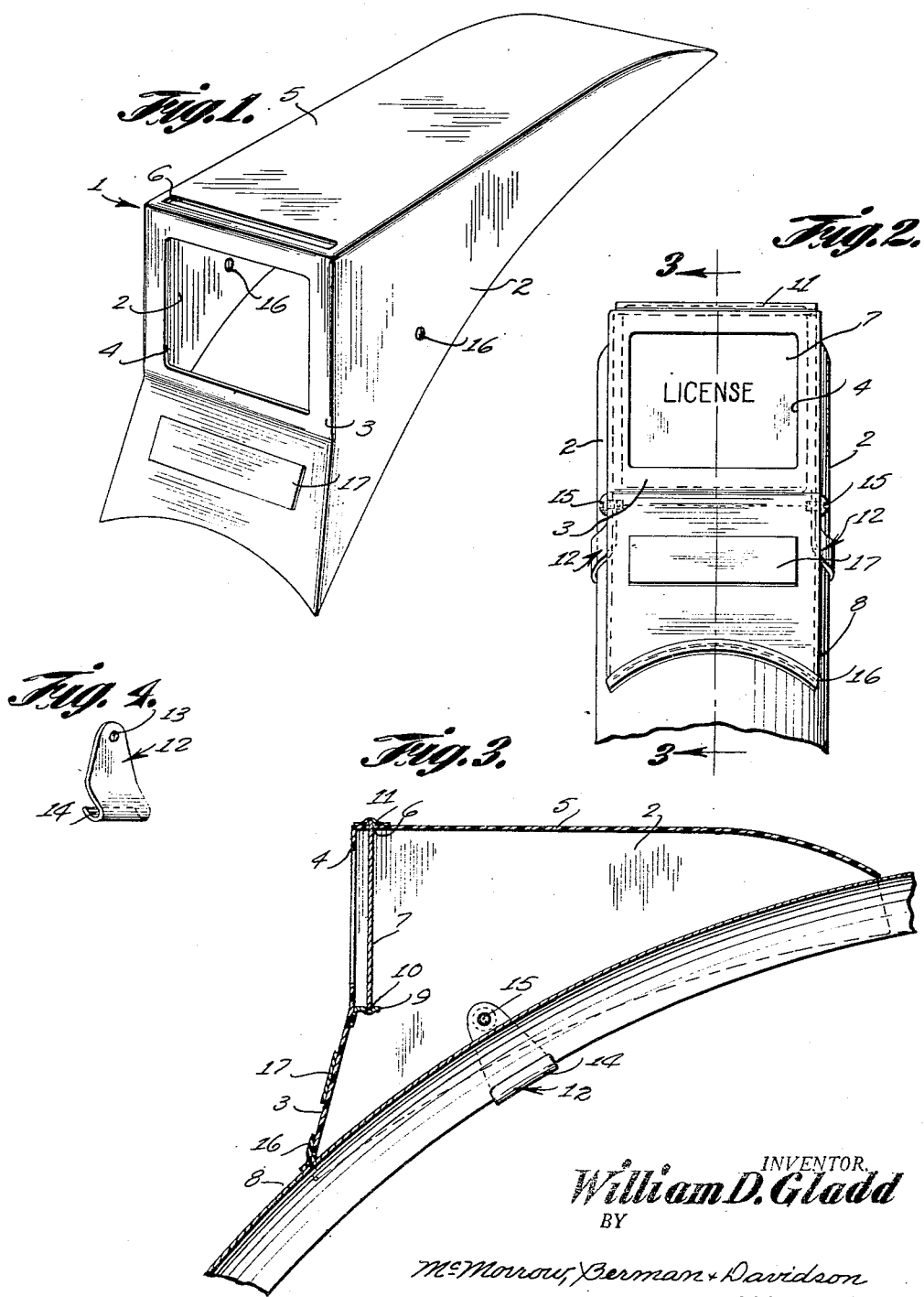
INVENTOR.
William D. Gladd
BY
McMorrow, Berman + Davidson
ATTORNEYS

United States Patent Office 2,760,289
Patented Aug. 28, 1956

2,760,289
LICENSE PLATE MOUNTING FOR VEHICLE FENDERS

William D. Gladd, Saranac Lake, N. Y.

Application April 13, 1954, Serial No. 422,931

1 Claim. (Cl. 40—125)

This invention relates to improvements in license plate mountings for vehicle fenders.

An object of the invention is to provide a license plate mounting for a vehicle fender which may be fastened upon the convex, upper surface of a vehicle fender to hold a license plate in upstanding position thereon.

Another object of the invention is to provide a license plate mounting for a vehicle fender which fits smoothly over a portion of the convex surface of a fender so as to appear to be formed integrally with the fender.

Other objects and advantages of the invention will appear from the following description considered in conjunction with the attached drawing, in which:

Figure 1 is a perspective view of a mounting of the present invention.

Figure 2 is an end elevation thereof.

Figure 3 is a view taken along the line 3—3 of Figure 2.

Figure 4 is a detail view of a securing means used to fasten the mounting to the edge of a vehicle fender.

Referring now to the drawings in more detail, the illustrated device comprises a housing 1 which includes a pair of spaced parallel triangular side walls 2, a rectangular front wall 3 provided with a viewing opening 4, and a top wall 5 supported upon the triangular side walls 2 and the front wall 3 and having a closed slot 6 adjacent the front 3, for the insertion of a license plate 7 into registry with the viewing opening 4. The lower edges of the triangular side walls 2 are arcuately shaped to fit conformably upon the upper surface of a vehicle fender 8, in order to support the housing 1 with the front wall 3 in upstanding position upon the fender 2.

A flange 9 is secured upon the inner face of the front 3 adjacent and below the viewing opening 4. The flange 9 has a longitudinally extending groove 10 therein, which groove 10 is adapted to receive the lower edge of the license plate 7 when the plate 7 is inserted through the slot 6, to support the plate 7 in registry with the viewing opening 4. The upper edge portion of the plate extends exteriorly of the housing 1 through the slot 6 and is covered by a strip of tape 11, which prevents the plate 7 from rattling against the adjacent portions of the top wall 5 and prevents dirt from entering the housing 1 through the slot 6.

Securing means, upon the lower edges of the sidewalls 2, are adapted to engage the edges of a vehicle fender for securing the housing 1 upon the fender. Specifically, the securing means consists of a pair of clips 12. Each clip 12 consists of an upper portion having a threaded aperture 13 and a hook-shaped lower portion 14. A clip 12 is positioned with its upper portion flush against the inner face of each sidewall 2 intermediate the ends thereof and with the lower portion 14 hooked about the adjacent edge of the fender 8. A screw 15, having the free end portion of its shank extending interiorly of the housing 1 through a hole 16 in each sidewall 2 of said housing, is threaded through the aperture 13 in the adjacent clip 12 to secure the clip 12 to the housing 1 and thus, to hold the housing 1 upon the fender 8.

A strip of rubber, or other friction giving material, 16 is secured along the lower edge of the front wall 3 and extends downwardly therefrom into frictional engagement with the adjacent portion of the fender 8 to prevent longitudinal movement of the housing 1 upon the fender 8.

A strip of reflective tape 17 is glued or otherwise secured upon the outer face of the lower portion of the front wall 3 and serves to reflect light falling thereon, the said lower portion being disposed at a downward and rearward angle to the upper portion of the front wall 3.

The mounting may be easily and quickly mounted upon, or demounted from, a vehicle fender. The clips 12 are attached loosely to the sidewalls 2 by means of the screws 15. The housing 1 is then placed down upon the convex upper surface of the vehicle fender in the desired position and the hooked, lower end portions of the clips 12 are engaged about the adjacent edges of the vehicle fender. When the screws 15 are now tightened the attachment will be held firmly upon the convex surface of the fender and the free side of the strip 16 bearing frictionally upon the upper surface of the fender will further discourage any tendency of the housing to move forward or backward upon the fender. A license plate may now be inserted through the slot 6 until its lower edge is supported in the groove 10 of the flange 9, in which position the markings upon the license plate will be visible through the viewing opening 4. The dimensions of the housing are such that the upper edge portion of the license plate supported upon the flange 9 will project a short distance above the top 5 through the slot 6 and may be grasped by the fingers to remove the plate from the housing. When the plate is in position within the housing, a strip of adhesive tape is placed along the upper edge of the license plate and adhered to the adjacent portions of the top wall 5 to prevent the rattling of the plate and to keep dirt out of the housing. It will be readily undersood that the license plate may be removed from the housing and the attachment dismounted from the fender by a simple reversal of the steps just discussed.

As will be apparent from the foregoing description, the attachment of the present invention may be firmly secured upon the convex, upper surface of the vehicle fender and when so secured provides an enclosed support for holding a vehicle license in upright, display position, as required by vehicle laws. Although the license is held in upright position, the housing itself tapers and blends into the fender as though it were formed integrally therewith, giving an attractive, streamlined appearance.

What is claimed is:

In a license plate mounting, a housing comprising spaced continuous sidewalls having upper and lower edges, said lower edges being concavely curved to conform to a vehicle fender, a top wall secured to said upper edges and extending between said sidewalls and continuous with said sidewalls, said sidewalls and said top wall having front edges, a vertical front wall secured to the front edges of the top and sidewalls and extending therebetween, said front wall having a concave lower edge to conform to the transverse curvature of a vehicle fender, said front wall having a viewing opening, and means on said housing for supporting a license plate within said housing in registry with said viewing opening, said supporting means comprising a flange on said front wall within said housing, a transverse slot in said top wall close to said front wall and vertically aligned with said flange, and means closing said slot and arranged to retainably engage a license plate disposed upon said flange and in said slot.

References Cited in the file of this patent

UNITED STATES PATENTS

| | | |
|---|---|---|
| 658,158 | Millen | Sept. 18, 1900 |
| 1,887,727 | Adams | Nov. 15, 1932 |

FOREIGN PATENTS

| | | |
|---|---|---|
| 222,677 | Switzerland | Oct. 16, 1942 |